United States Patent Office 2,828,028
Patented Mar. 25, 1958

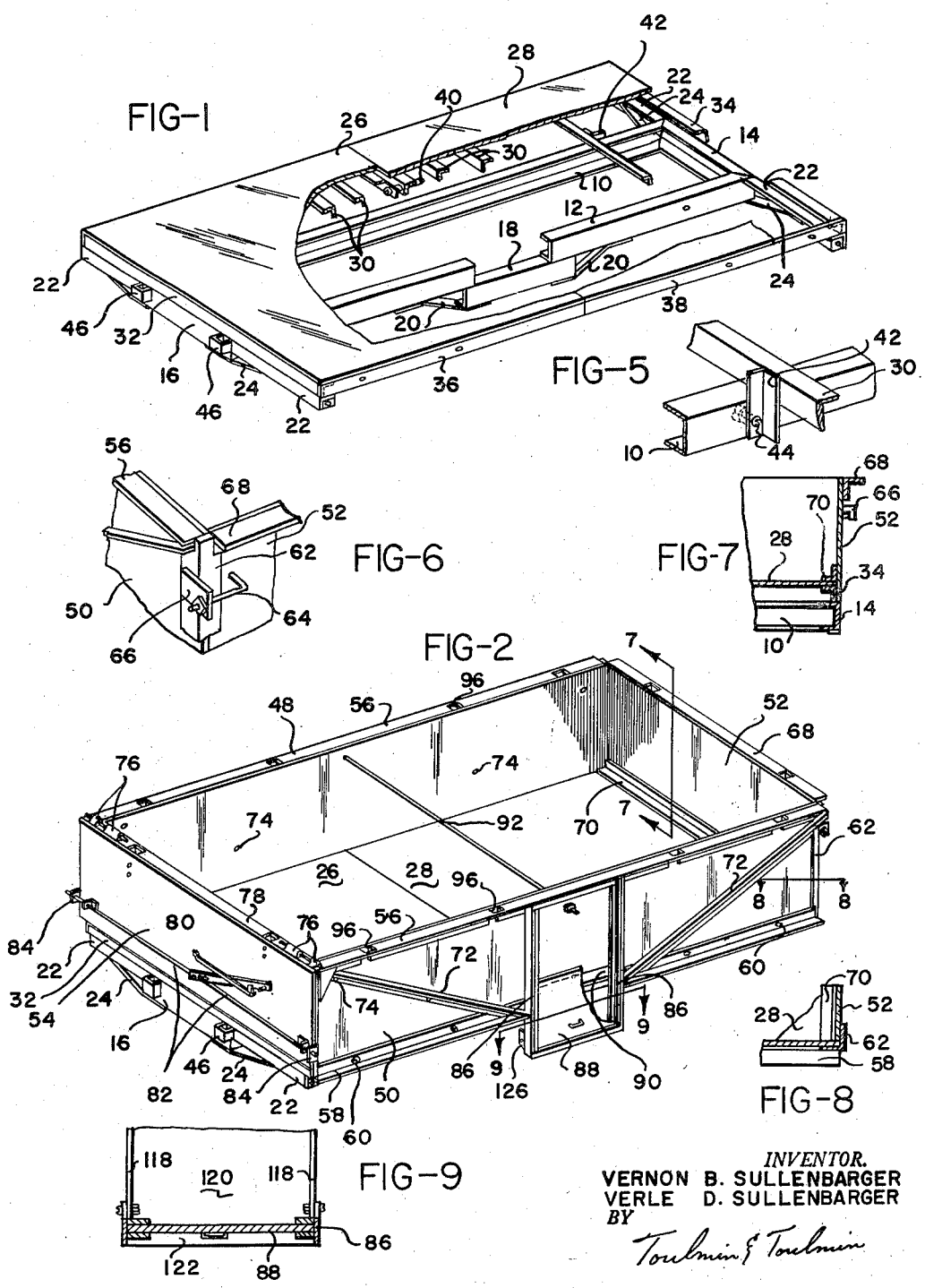

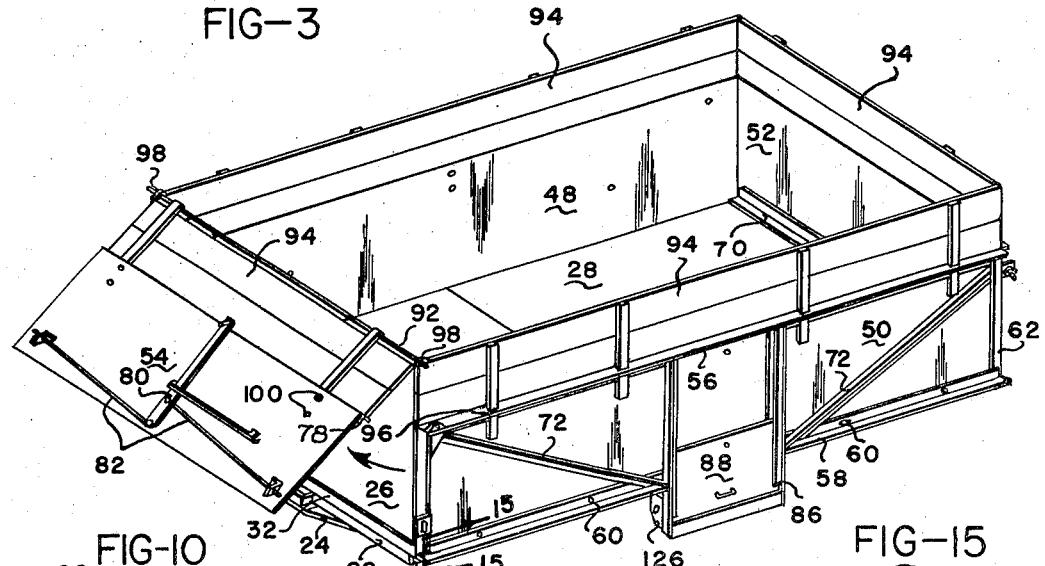
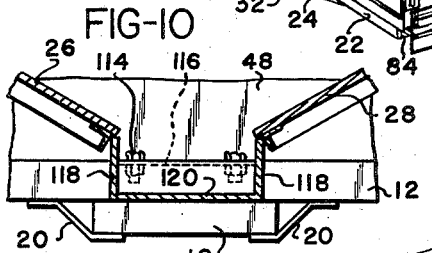
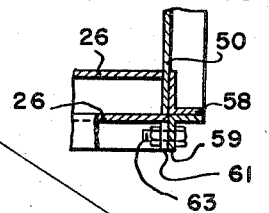
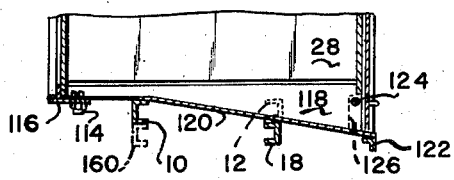

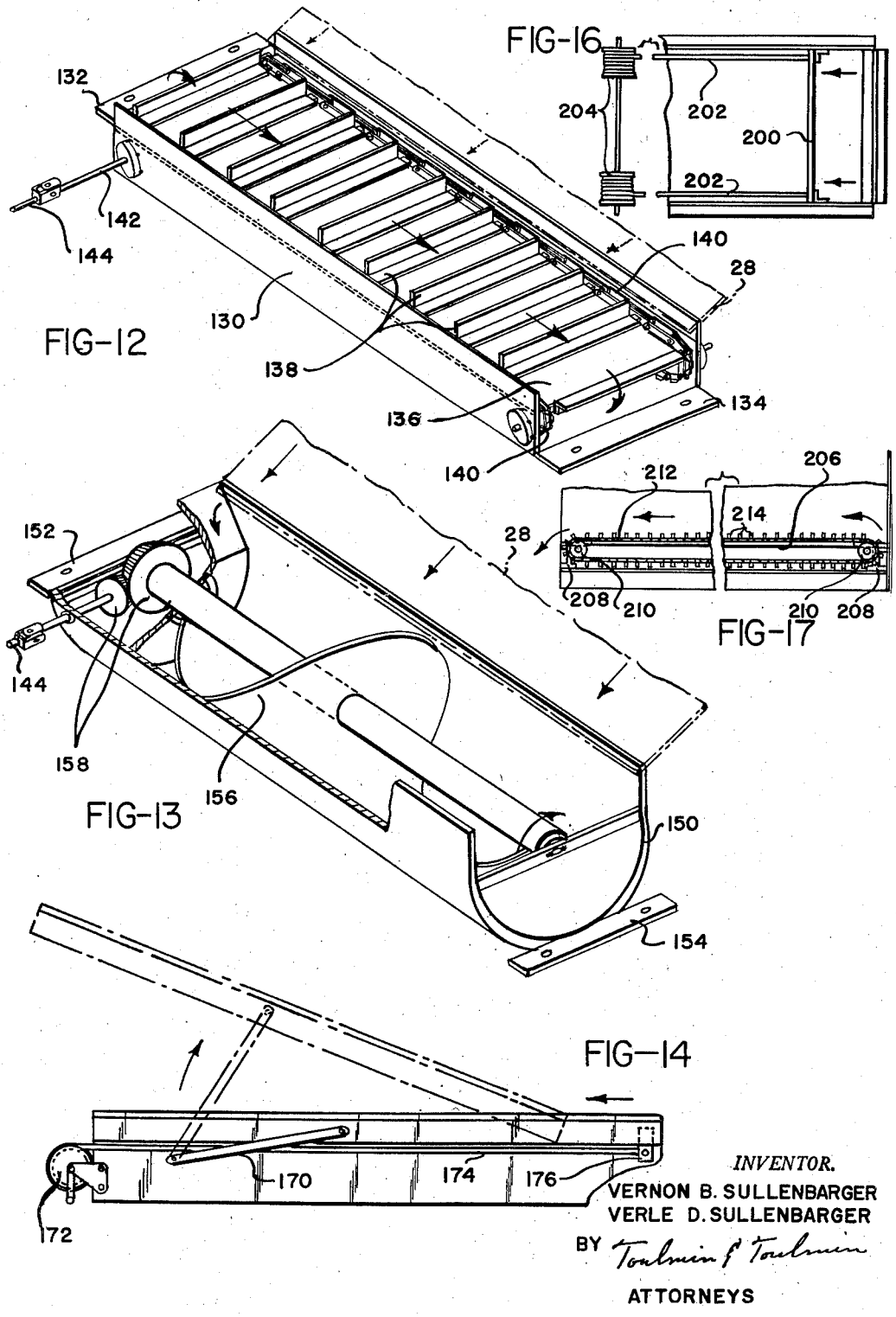

2,828,028

CONVERTIBLE FARM WAGON

Vernon B. Sullenbarger and Verle D. Sullenbarger, New Paris, Ohio

Application February 5, 1957, Serial No. 638,310

7 Claims. (Cl. 214—83.18)

This invention relates to a farm wagon and in particular to a farm wagon convertible into a plurality of types of wagon whereby the utility of the wagon is greatly enhanced. Farm wagons are generally made for a single purpose, and because of this it is necessary on most farms to have two or more wagons available in order to carry out the different work operations required at different times. This, of course, represents a considerable investment to the farmer, and such wagons naturally occupy a substantial amount of space thus requiring extra storage space for housing the wagons when not in use.

A particular object of the present invention is the provision of a farm wagon which will have more general utility than has heretofore been possible by being convertible from one type use to another.

Another object of this invention is the provision of a body for a farm wagon and which body is adapted for being placed on a conventional wagon running gear, and is so arranged as to be convertible into a plurality of different types without removing the wagon body from the running gear of the wagon.

A still further object is the provision of a wagon body for a farm wagon which is relatively simple to make, and which consists of a plurality of substantially flat elements adapted for being interconnected in various manners to form a plurality of different types of wagon bodies.

A still further object of this invention is the provision of a wagon body which is readily adapted for being equipped with power mechanisms for effecting the unloading thereof.

These and other objects and advantages of this invention will become more apparent upon reference to the following specification taken in connection with the accompanying drawings, wherein:

Figure 1 is a perspective view showing the bed part of a wagon body according to the present invention and the manner in which it is arranged for being attached to a subframe which, in turn, rests on the running gear of a wagon;

Figure 2 is a perspective view showing the wagon body according to the present invention with the sides thereon to form a flat bottom wagon;

Figure 3 is a perspective view showing the wagon body about as it is illustrated in Figure 2, except with extension gates mounted on the sides so that the wagon can be utilized for hauling bulkier objects then would be placed in the Figure 2 arrangement;

Figure 4 is a perspective view partly broken away showing the wagon body arranged as a grain wagon;

Figure 5 is a fragmentary perspective view showing the manner in which the cross members beneath the floor of the wagon body are detachably connected to the subframe of the wagon body;

Figure 6 is a perspective view showing the manner in which the front end part of the wagon body of Figure 2 is connected with the side of the body;

Figure 7 is a sectional view indicated by line 7—7 on Figure 2 showing the manner in which the rear end of the wagon body is set in place on the bottom thereof;

Figure 8 is sectional view indicated by line 8—8 on Figure 2 showing the abutment between the front end wall of the wagon body of Figure 2 and the side wall thereof;

Figure 9 is a sectional view indicated by line 9—9 on Figure 2 showing the manner of supporting a sliding gate in the one side wall of the wagon body to form an opening through which the wagon body can be unloaded;

Figure 10 is a sectional view indicated by line 10—10 on Figure 4 showing in cross section the inclined chute that is employed when the wagon body is converted for use as a grain wagon, and also illustrating how the floor panels rest on the side edges of the chute;

Figure 11 is a sectional view indicated by line 11—11 on Figure 4 showing the chute in longitudinal cross-section;

Figure 12 is a perspective view, more or less diagrammatic in nature, showing one manner in which a power-driven conveyor could be included in the chute of the grain wagon for effecting the power unloading thereof;

Figure 13 is a view similar to Figure 12, but shows an auger-type unloader;

Figure 14 is a more or less diagrammatic view showing the manner in which the bed members of the wagon could be provided with power means for moving them upwardly to their Figure 4 position for converting the wagon to a grain wagon;

Figure 15 is a sectional view indicated by line 15—15 on Figure 3 showing the manner in which the side walls of the wagon body are bolted to the outer ends of the end members of the subframe;

Figure 16 is a fragmentary plan view showing an arrangement whereby a false end gate can be placed in the wagon body for facilitating the unloading thereof; and Figure 17 is a vertical sectional view showing the manner in which a false bottom can be placed within the wagon body and a cleat-type unloader associated therewith.

Referring to the drawings somewhat more in detail, the wagon illustrated in Figures 1-4 consists of a subframe which may be made up of a plurality of interconnected channel members consisting of the side channels 10 and 12, and the end channels 14 and 16. The one side channel 12 is interrupted intermediate its length, and the space created in this manner is bridged by a channel member 18 fixed to the two end parts of channel 12 beneath the said space and braced as by the bracing straps 20.

The subframe of the wagon body also comprises angle members projecting laterally from the opposite ends of the end channels 14 and 16, as indicated in 22, and which angles are braced by the brace members 24 thereunderneath.

The subframe is adapted for supporting thereon the bottom and sides of the wagon body proper. The bottom consists of a pair of flat panels 26 and 28 provided on their underneath sides with transversely extending angles 30. These angles 30 are adapted for resting on the channels 10 and 12 for supporting the floor panels 26 and 28. The outer ends of panels 26 and 28 are provided with the angles 32 and 34 respectively, and the side edges thereof are provided with the stiffening bars 36 and 38 respectively.

All of these elements are welded together, and this forms an extremely strong although relatively light structural element which at the same time is quite flat, so that when the wagon body is knocked down it can be shipped in a relatively small space.

The angles 30 beneath the adjacent edges of panels 26 and 28 are provided with apertures through which bolts 40 extending for bolting the two floor panels together. The two floor panels are, in turn, fixed in position on the subframe by the vertically extending angles 42 that engage the outsides of channels 10 and 12 toward the outer ends thereof to be secured thereto by bolts 44. This forms a rigid connection between the subframe and the floor panels of the wagon.

The arrangement illustrated in Figure 1 forms a complete flat bed wagon useful for many purposes such as transporting bags of grain or hay, or other bulky articles, that require considerable space and do not tend to shift substantially in ordinary travel. The body arrangement illustrated in Figure 1 preferably has the loops 46 at the back end, or at both ends, if desired, into which stakes can be set to form uprights at the ends of the body, which may be desired for a hay wagon or for carrying logs or the like; or, these loops may be employed for connecting a hay loader or a like mechanism with the wagon body.

Figure 2 shows the appearance of the wagon body when it is provided with side and end walls. The bottom channels and other parts of the bed of the wagon are the same as illustrated and described in Figure 1, but there is provided the side walls 48 and 50, the front wall 52, and the back wall or swinging end gate 54. The side walls 48 and 50 are each provided with top angles 56 and bottom angles 58, and the bottom angles 58 are bolted to bars 36 and 38 by bolts 60.

The rear edges of side walls 48 and 50 have angles 62 secured thereto that engage the side edges of the front wall 52. The wall 52 is provided with an angle bolt 64 receivable in a clip 66 carried by the side wall, so as to bolt the end and side walls together. Rear wall 52 has a top angle 68 on the outside, and an inner bottom angle 70 that rests on the back edge of floor panel 28, as will be seen in Figure 7.

The side walls 48 and 50 are each provided with diagonally extending bracing angles 72, and through these angles and the side walls directly therebeneath are drilled the holes 74 which are employed in connection with the modified arrangement of Figure 4.

The rear swinging gate 54 of the wagon is pivotally connected to the rearmost top edge part of the side walls 48 and 50 by hinges 76 of any simple and convenient type. The rear wall comprises an inwardly extending top angle 78, and carries a manually operable latch means 80. The latch means includes rods 82 adapted for being moved outwardly to engage apertured lugs or ears 84 on the side walls 48 and 50, or can be pulled inwardly out of the lugs or ears so that the gate can be swung backwardly at the bottom for unloading.

The side wall 50 is provided with vertical track means 86 formed thereon by a plurality of interconnected bars as will be seen in Figure 9, and within which track means is slidable a door 88. The side wall 50 beneath door 88 is cut out at 90 to form an opening through which material can be unloaded from the inside of the wagon body upon lifting of the door 88, if so desired.

The wagon body arrangement of Figure 2 is adapted for use in hauling heavy material of a shiftable nature, and it is preferable that there be provided a transversely extending tie-bar 92 connecting the two side walls together in the region of the center thereof and adjacent the top, thereby preventing the side walls from bowing outwardly under load.

Figure 3 shows a still further modified arrangement of the wagon body in which the parts are connected the same as in Figure 2, except that there is provided extension racks 94 that are provided with stakes disposed in the apertures 96 provided in the angles at the tops of the side and front and back walls of the wagon body. These apertures will clearly be seen in Figure 2.

The extension mounted on the swingable rear end gate 54 is arranged to be pivotally connected with the extensions on the sides of the wagon by availing of the tie-rod 92 which is adapted for extending through the pivot blocks 98 on the wall gates.

This arrangement not only pivotally interconnects the rear and side extension members, but it also connects the side extension member together against spreading apart.

It will be understood that the extension members could be interconnected at the opposite end by a similar tie-rod, or there could be interconnecting clips mounted at the adjacent ends of the extensions adapted for interlocking engagement.

The extension on the rear swinging end gate is adapted for being bolted thereto, as by the bolts 100, and this permits the end gate to be swingable about rod 92, as indicated at Figure 3, to facilitate unloading operations.

The modification of Figure 4 illustrates the wagon body according to the present invention modified so as to form a grain wagon body, or a wagon body suitable for handling flowable material.

The body of Figure 4 uses the same body parts as Figure 2, except the front and back gates are removed and a chute is placed in the center of the body, and the floor panels are tilted upwardly.

As will be seen in Figure 4, panels 26 and 28 are unbolted from each other in the center and are unbolted also from the side walls of the wagon body. The front and back members 52 and 54 are removed, and then the floor panels 26 and 28 are lifted upwardly and attached to the side walls 48 and 50 by bolts 110, which extend through the holes 74 in the side walls and also through the holes in the side bars 36 and 38 of the floor panels that received the bolts 60 by means of which the side walls were connected to the floor panels.

This results in the floor panels being supported diagonally between the side walls of the wagon as illustrated in Figure 4, and with a space between the floor panels at their lower inner ends.

This space, as will be seen in Figures 4 and 10, is of a size to receive a trough member 112 which is bolted by bolts 114 at its rear or shallow end to a plate or clip 116 secured to the lower edge of the side wall 48 and extending underneath the shallow end of the trough. This is best seen in Figures 4 and 11.

The trough consists of side wall portions 118 that engage beneath the extreme inner edges of the inclined floor panels, thus making a tight joint between the trough and the floor panels to prevent grain from leaking out. This also assists in supporting the floor panels against deflection due to loads therein.

The trough also comprises a bottom wall 120 which rests on the longitudinal extending channel members 10 and 18 of the subframe; and at its extreme right end the bottom member of the trough rests on top of a transversely extending angle 122 which is welded at its ends to the bars 86 making up the track for the slidable door 88.

The end of bottom member 120 of the trough may be bolted to angle 122, or this member may advantageously be left free of upstanding bolts, and the right ends, instead, of the side wall members 18 can be bolted at 124 to clips 126 secured to the sides of the door track, and extending rearwardly therefrom as will be seen in Figures 2, 3 and 9.

The arrangement of Figure 4 permits grain or other flowable materials such as sand or gravel to be placed within the wagon body and readily discharged through the side merely by opening the door. A minimum of labor will be required to remove the entire amount of material within the wagon body.

In certain cases, the material within the wagon body might not be readily flowable through the size opening that can be provided therefor by the slidable door or along the relatively slight incline that can be provided by the transversely extending trough. In such cases, and also in cases where it might be desired to increase the rate of speed of discharge from the wagon body, or to eliminate all manual labor in connection with unloading the wagon, the trough may be replaced by a modified trough structure including power means for discharging the material from the wagon body out the end of the trough.

Such arrangements are shown in Figures 12 and 13. In Figure 12, there is a generally rectangular trough 130 having a horizontally extending tab or flange 132 at its one end adapted for engaging and being bolted to clip 116 previously referred to and having at its other side a flange or tab 134 adapted for resting on and being bolted to angle 122 previously referred to on the opposite side of the wagon. As before, the trough includes side portions that engage the inner lower ends of the floor panels, so that material sliding down the floor panels will fall into the trough.

The arrangement of Figure 12 includes a floor panel 136 and slidable therealong a plurality of transversely extending cleat means 138 interconnected by chains 140. Chains 140 are adapted for being driven by a shaft 142 at one end, and this shaft is connected via a flexible drive means 144 with any suitable source of power such as a tractor power takeoff. The arrangement illustrated in Figure 12 permits power unloading of the wagon at any time, and in all other respects is the same as the modification described in Figure 4.

Figure 13 shows another power trough arrangement wherein the trough 150 is substantially semi-circular and has a rear mounting tab on 152 and a front mounting tab 154. The trough in Figure 13 has mounted therein an auger 156 driven by gearing 158 from a flexible drive such as described in connection with Figure 12. The Figure 13 arrangement operates the same as the Figure 12 arrangement, and the wagon body pertaining to the Figures 12 and 13 modifications is identical to the body of Figure 4 except for the difference in the troughs.

Since both of the troughs of Figures 12 and 13 are lacking in having a shallow end, it is preferable for both of the side channels of the subframe to be interrupted and to have a member connected across the opening on the under side of the channel members. Thus, as indicated in Figure 11 by the dot-dash outline at 160 both of the side channel members of the subframe would be formed identical for use with a power discharge chute.

In many cases, the floor panels of the wagon might reach substantial sizes and be made of relatively heavy metal and thus become quite heavy. With this in mind, the present invention also proposes a power arrangement for moving the floor panels up and down; and this power arrangement might consist, for example, of a pivot bar 170 pivoted at one end to the subframe, and at its other end to one of the floor panels.

A winch arrangement at 172 and a cable 174 loading therefrom to point 176 adjacent the inner end of the floor panel would permit the floor panel to be lifted toward the dot-dash position indicated by cranking of the winch and thereby facilitating the movement of the floor panel and reducing hazards in connection with this operation where the floor panel was extremely large and heavy.

From the foregoing, it will be evident that the present invention provides for an extremely flexible wagon body structure that can easily be converted from one type of operation to another. Thus, within a few minutes, a person of ordinary skill can convert the wagon from a flat bed wagon to a conventional wagon having sides or to a wagon having extended sides therein, or to a grain wagon having inclined floor panels.

The arrangement of the present invention is such that the chute may be left in position in the subframe of the wagon body when the floor panels are lowered therein to form a flat bed body, or the said chute may be detached and removed from the subframe, if preferred.

Thus, the basic part of the wagon body could be purchased at one time and the other parts thereof, such as the extension gates, the gravity discharge chute, the power conveyors, and the winch-operated lift mechanisms purchased at a later date and added thereto.

As will be seen in Figure 15, the side walls of the wagon body are arranged so as to remain fixed in position in all adjusted positions of the floor panels by means of the bolts 63 which extend through the clips 61 that are welded to the ends of the cross-members 22 extending outwardly from the ends of the subframe. These clips are engaged by small angle clips 59 which may be welded to the underneath sides of bottom angles of the side walls. In this manner the side walls are fixed to and located on the subframe whether the floor panels are flat or in their inclined positions.

For certain uses of the wagon, such as a forage wagon, automatic rear end unloading is desirable and with this in mind the modifications of Figuure 16 and 17 are contemplated. In Figure 16 the wagon body is illustrated diagrammatically and there is provided a false end gate 200 connected by cable means 202 with winch arrangement 204. The winch arrangement may be power driven or manually operated and serves to move the false end gate toward the back of the wagon body thus forcing the forage, ensilage, for example, out the rear end gate of the wagon at a more or less uniform rate.

Figure 17 shows an arrangement where a false bottom 206 is provided with supporting legs in the form of T-members 208 so that the false bottom can be set in place on the wagon bottom and forage loaded into the wagon body on top of the false bottom. The unloading of the wagon body is then accomplished by rotating the sprockets or pulleys 210 over which pass the belt or chain means 212 that carry the transversely extending cleats 214. This arrangement also provides for unloading of the load in the wagon at a fairly uniform rate and, as before, the unloading mechanism may either be manually operated or power driven.

It will be understood that this invention is susceptible to modification in order to adapt it to different usages and conditions; and, accordingly, it is desired to comprehend such modifications within this invention as may fall within the scope of the appended claims.

We claim:

1. In a body for a farm wagon, said body being adapted for a plurality of uses, a subframe for the body comprising laterally spaced longitudinal channels adapted for being supported on the running gear of a wagon, side walls adapted for detachable connections with the subframe at opposite ends, a pair of floor panels resting on the subframe and abutting in the region of the transverse center line thereof, said floor panels being detachably connected with each other and with the side walls and also being adapted for being detachably connected to the side walls at an angle with their inner ends in spaced relation, end walls arranged for detachable connection with the side walls of the wagon body, at least the rear end wall being swingable to form an end gate, one of said channels having a portion cut out for receiving a chute extending laterally in the region of the center of said body, said floor panels in their inclined position engaging the side edges of said chute.

2. In a body for a farm wagon, said body being convertible from one type of service to another, a subframe, a pair of floor panels resting on the subframe and abutting in the region of the transverse center line of the subframe, side walls for the wagon body engaging the outside edges of the floor panels and detachably connected with the subframe at the ends thereof and also adapted for detachable connection with the said floor panels, front and rear walls detachably connected with said side walls and floor panels, at least the rear wall being swingable to form a gate and stake receiving aperture means along the top edges of the front and rear and side walls for supporting extension panels to increase the depth of the wagon bed.

3. In a grain wagon; a pair of spaced side walls, a pair of flat bottom panels extending between the side walls and detachably connected therewith and tilted downwardly toward the center of the body and having their inner ends spaced apart, transversely extending chute means detachable fastened at its opposite ends to said side walls and having side edges abuttingly engaged by the inner ends of said floor panels, and a slidable gate carried by one side wall adapted for being raised and lowered to open and close the end of said chute, said chute having power operated conveyor means carried thereby so as to be removable therewith for moving them materially therealong toward said gate, each bottom panel being half the length of said side walls whereby a flat bottom closure for the wagon can be formed thereby when detached from the side walls.

4. In a wagon; a frame having longitudinal channels and transverse end members connected thereto a pair of flat bottom panels resting on the frame and forming a flat wagon bed, said panels abutting on the transverse center line of said frame and being detachably interconnected, transverse stiffening members attached to the undersides of said floor panels resting on said channels and angle members at the extreme outer ends of the floor panels resting directly on the end members of the frame, certain ones of said stiffening members inwardly from the ends of the frame having vertical angle elements attached thereto extending downwardly on opposite sides of said channels and adapted for detachable connection thereto to hold the bottom panels to the frame, and means on the outside of the angle member at at least one end of the frame for detachably supporting upright members thereon.

5. In a grain wagon body; a subframe comprising a plurality of interconnected channel members, side walls connected therewith extending upwardly from the sides of said subframe, a pair of bottom panels connected between the side walls and said bottom panels extending downwardly toward the center of the wagon body and terminating in spaced relation adjacent the bottom edges of the side walls, a transversely extending chute connected at its opposite ends to said side walls and having upstanding side edges engaging the inner ends of said bottom panels, at least one of the channel members of the frame being cut out to provide a space for receiving said chute, and the said cut-out portion of the channel being bridged to provide for a rigid structural member, and a gate vertically slidable on one of said side walls for selectively closing one end of the chute.

6. A wagon body comprising a subframe formed of a plurality of interconnected channels adapted for resting on the running gear of a wagon, side, front and back walls detachably connected with said subframe and extending upwardly therefrom, said back wall being swingably supported on the said side walls, a pair of flat bottom floor panels resting on the subframe and extending between the side walls and between the front and back walls abutting at a point intermediate the front and back walls whereby to form a flat bed wagon body, said floor panels having transverse stiffening members therebeneath, and means attached to certain ones of said stiffening members and extending along the sides of the channel members of the subframe forming means for detachably attaching the said floor panels to the subframe whereby the side, front and back walls of the wagon can be removed to form a simple flat bed wagon.

7. In a wagon, a subframe, a pair of flat bottom panels resting on the subframe and forming a flat bed therefor, said panels abutting on the transverse center line of the frame and being detachably interconnected, said bottom panels being adapted for having their outer ends raised upwardly so that they form a trough like arrangement inclined downwardly toward the center of the wagon, a cable connected with each bottom panel toward the center of the wagon body, a bar connected between the subframe and an intermediate point of each bottom panel, and winch means for pulling on the cable whereby operation of the winch means will result in tilting of the bottom panels in the described manner without manual lifting thereof.

References Cited in the file of this patent

UNITED STATES PATENTS

| | | |
|---|---|---|
| 1,928,859 | Kutscha | Oct. 3, 1933 |
| 2,116,807 | Thrall | May 10, 1938 |
| 2,512,339 | Knapp | June 20, 1950 |
| 2,591,556 | Knutson | Apr. 1, 1952 |
| 2,609,115 | Oklejas | Sept. 2, 1952 |
| 2,784,854 | Roberts | Mar. 12, 1957 |